United States Patent
Woods et al.

(10) Patent No.: US 12,090,872 B2
(45) Date of Patent: Sep. 17, 2024

(54) SYSTEMS, METHODS, AND APPARATUS FOR MANAGING STORAGE OR DELIVERY OF ELECTRICAL ENERGY

(71) Applicant: Toyota Motor Engineering & Manufacturing North America, Inc., Plano, TX (US)

(72) Inventors: Brian Woods, Brighton, MI (US); Hideki Hada, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 133 days.

(21) Appl. No.: 17/863,210

(22) Filed: Jul. 12, 2022

(65) Prior Publication Data

US 2024/0017628 A1   Jan. 18, 2024

(51) Int. Cl.
*B60L 53/16* (2019.01)
*H02J 7/00* (2006.01)
*H02J 7/34* (2006.01)

(52) U.S. Cl.
CPC ............ *B60L 53/16* (2019.02); *H02J 7/0013* (2013.01); *H02J 7/0042* (2013.01); *H02J 7/0047* (2013.01); *H02J 7/342* (2020.01)

(58) Field of Classification Search
None
See application file for complete search history.

(56) References Cited

U.S. PATENT DOCUMENTS

| | | |
|---|---|---|
| 4,957,829 A | 9/1990 | Holl |
| 6,583,603 B1 | 6/2003 | Baldwin |
| 8,350,526 B2 | 1/2013 | Dyer et al. |
| 8,810,198 B2 | 8/2014 | Nergaard et al. |
| 9,246,200 B2 | 1/2016 | Kang et al. |
| 9,385,351 B2 | 7/2016 | Workman et al. |
| 10,046,649 B2 | 8/2018 | Bertness |
| 10,536,007 B2 | 1/2020 | Beaston et al. |
| 10,833,302 B2 | 11/2020 | Nguyen |
| 10,919,162 B2 | 2/2021 | Sohmshetty et al. |
| 11,088,549 B2 | 8/2021 | Lim et al. |
| 2019/0016097 A1 | 5/2019 | Zeiler et al. |
| 2019/0322189 A1 | 10/2019 | Allison et al. |

(Continued)

*Primary Examiner* — Jared Fureman
*Assistant Examiner* — Aqeel H Bukhari
(74) *Attorney, Agent, or Firm* — Snell & Wilmer LLP

(57) ABSTRACT

A system for managing storage or delivery of electrical energy. The system includes a plurality of stackable energy storage devices, one or more connectors, a plurality of switches, and a controller. The stackable energy storage devices receive the electrical energy from at least one external device or provide the electrical energy to the at least one external device. Each connector connects to a plug of a cable extending from an external device and provides a connection between an energy storage device and the external device. The switches are disposed between the energy storage devices and the one or more connectors and open or close the connection between the energy storage device and the external device. The controller controls the switches to open or close the connection. The system includes a user interface for receiving user input, and the controller controls the switch based on the user input.

20 Claims, 5 Drawing Sheets

(56) References Cited

U.S. PATENT DOCUMENTS

| | | |
|---|---|---|
| 2020/0274379 A1 | 8/2020 | Schurink et al. |
| 2021/0226460 A1 | 7/2021 | Segnit |
| 2022/0115877 A1* | 4/2022 | Stanfield ................. B60L 53/16 |
| 2023/0045735 A1* | 2/2023 | Neligan ................... B60L 53/20 |
| 2023/0122692 A1* | 4/2023 | Spina ...................... B60L 53/66 |
| | | 320/109 |

* cited by examiner

SYSTEMS, METHODS, AND APPARATUS FOR MANAGING STORAGE OR DELIVERY OF ELECTRICAL ENERGY

BACKGROUND

Field

The present disclosure is directed to systems, methods, and apparatus for managing storage or delivery of electrical energy.

Description of the Related Art

Fuel-efficient vehicles (e.g., hybrid, plug-in hybrid, electric, fuel cell vehicles, etc.) continue to gain popularity over the years. Energy storage devices (e.g., batteries) of the fuel-efficient vehicles that supply power to their motors (e.g., electric motor, internal combustion engine, and/or the like) to propel the vehicles may also supply power to native components of the vehicles (e.g., air conditioner, seat heater, infotainment unit, etc.) as well as remote devices (e.g., refrigerator, ventilator, music player, speaker, outdoor light, electric stove, smartphone, etc.). Some energy storage devices may even supply power to homes, businesses, and recreational vehicles (RVs). For example, some vehicles (e.g., pick-up trucks, vehicles towing trailers, and/or the like) may use vehicle batteries to supply power to remote devices (e.g., off an electric grid) while a user is participating in recreational outdoor activities such as camping, providing emergency services, working in a construction site, etc.

Several concerns exist with such a fuel-efficient vehicle which conventionally requires a charging station (e.g., at home, outdoors, etc.) to charge its energy storage device (e.g., a battery). For example, there are not as many charging stations (e.g., quick-charge or fast-charge charging stations) currently available as desired, and a range such a vehicle can travel (which sometimes may not be sufficient to go from one location to another) may drop even further when, e.g., a trailer is attached to the vehicle resulting in a heavier load. Moreover, capital expenditure ("CAPEX") needed to make and maintain each additional charging station may be very expensive.

Furthermore, the energy storage device of such a fuel-efficient vehicle may need to be upgraded (requiring further cost), e.g., to a more expensive battery (i.e., with a higher capacity and capability) to meet various needs. Moreover, there may be a need to have a battery which can provide a back-up power or an energy source when going off-grid.

Due to such versatile use of batteries as well as an increase in the number of the fuel-efficient vehicles in use (thus requiring more charging stations each of which incurs high CAPEX), improved transportability and more versatile and efficient way to charge or discharge the batteries (e.g., of vehicles) are desirable. Hence, there is a need for advanced systems, methods, and apparatus to efficiently receive, store, and/or deliver electrical energy amongst multiple devices and/or vehicles.

SUMMARY

Described herein is a system for managing storage or delivery of electrical energy. The system includes a plurality of stackable energy storage devices, one or more connectors, a plurality of switches, and a controller. The plurality of stackable energy storage devices are configured to at least one of: receive the electrical energy from at least one external device, or provide the electrical energy to the at least one external device. The one or more connectors are each configured to: connect to a plug of a cable extending from an external device of the at least one external device, and enable a connection between an energy storage device of the plurality of stackable energy storage devices and the external device. The plurality of switches are disposed between the plurality of stackable energy storage devices and the one or more connectors and are each configured to open or close the connection between the energy storage device and the external device. The controller is coupled to the plurality of switches and configured to: control at least one switch of the plurality of switches to open or close the connection between the energy storage device and the external device such that: the electrical energy is received from or provided to the external device when the connection is closed, and the electrical energy is not received from or provided to the external device when the connection is open.

In some embodiments, the controller is further configured to control one or more switches of the plurality of switches such that the electrical energy is received from or provided to two or more external devices of the at least one external device. In some implementations, the controller is further configured to control the one or more switches of the plurality of switches such that the electrical energy is received from or provided to the two or more external devices of the at least one external device simultaneously. In some embodiments, the controller is further configured to control one or more switches of the plurality of switches such that: a first energy storage device of the plurality of stackable energy storage devices provides a first electrical energy to a first external device of the at least one external device, and a second energy storage device of the plurality of stackable energy storage devices receives a second electrical energy from a second external device of the at least one external device. In some implementations, the controller is further configured to control the one or more switches of the plurality of switches such that the first energy storage device provides the first electrical energy to the first external device and the second energy storage device receives the second electrical energy from the second external device simultaneously. In some embodiments, the at least one external device includes an electric vehicle including a battery. In some embodiments, the system further includes a plurality of receptacles each removably disposed within an apparatus including the system, the each receptacle being detachable from one another of the plurality of receptacles and configured to house at least one of the plurality of stackable energy storage devices. In some embodiments, the system further includes a user interface; and the user interface is configured to receive user input related to the electrical energy being received from or provided to the external device, and the controller is further configured to control the plurality of switches based on the user input. In some implementations, the user interface is further configured to provide output related to an amount of monetary compensation corresponding to the electrical energy received from the external device. In some implementations, the user interface is further configured to provide compensation corresponding to the electrical energy received from the external device.

Also described herein is a charging station for managing storage or delivery of electrical energy. The charging station may include a plurality of stackable energy storage devices configured to at least one of: receive the electrical energy from at least one external device, or provide the electrical energy to the at least one external device. The charging station may include one or more connectors each configured to: connect to a plug of a cable extending from an external device of the at least one external device, and enable a connection between an energy storage device of the plurality of stackable energy storage devices and the external device. The charging station may further include a plurality of switches disposed between the plurality of stackable energy storage devices and the one or more connectors and each configured to open or close the connection between the energy storage device and the external device. The charging station may further include a controller coupled to the plurality of switches and configured to: control at least one switch of the plurality of switches to open or close the connection between the energy storage device and the external device such that: the electrical energy is received from or provided to the external device when the connection is closed, and the electrical energy is not received from or provided to the external device when the connection is open.

In some embodiments, the charging station is mobile. In some embodiments, the charging station is stationary. In some embodiments, the charging station further includes a user interface; and the user interface is configured to receive user input related to the electrical energy being received from or provided to the external device, and the controller is further configured to control the plurality of switches based on the user input. In some implementations, the user interface is further configured to at least one of: provide output related to an amount of monetary compensation corresponding to the electrical energy received from the external device, or dispense money corresponding to the electrical energy received from the external device.

Also described herein is a method of managing storage or delivery of electrical energy. The method may include providing a plurality of stackable energy storage devices configured to at least one of: receive the electrical energy from at least one external device, or provide the electrical energy to the at least one external device. The method may further include receiving, via a user interface, user input regarding receiving the electrical energy from the at least one external device or providing the electrical energy to the at least one external device. The method may further include controlling, via a controller and based on the user input, a plurality of switches disposed between the plurality of stackable energy storage devices and one or more connectors to open or close a connection between an energy storage device of the plurality of stackable energy storage devices and an external device of the at least one external device, such that: the electrical energy is received from or provided to the external device based on the connection being closed, or the electrical energy is not received from or provided to the external device based on the connection being open.

In some embodiments, the method may further include controlling the plurality of switches such that the electrical energy is received from or provided to two or more external devices simultaneously. In some embodiments, the method may further include controlling the plurality of switches such that a first energy storage device provides a first electrical energy to a first external device and a second energy storage device receives a second electrical energy from a second external device simultaneously. In some embodiments, the method may further include providing compensation corresponding to the electrical energy received from the external device. In some implementations, the method may further include displaying information related to the compensation corresponding to the electrical energy received from the external device.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems, methods, and apparatus for managing storage or delivery or electrical energy. These systems, methods, and apparatus utilize, e.g., a plurality of stackable energy storage devices (e.g., batteries) and provide many benefits and advantages such as efficiently receiving, storing, and/or delivering the electrical energy amongst, e.g., one or more charging stations and one or more vehicles in a user-configurable manner. The efficient receiving, storing, and/or delivering of the electrical energy includes receiving and/or delivering the electrical energy from and/or to more than one vehicle simultaneously. These are advantageous because the plurality of stackable energy storage devices (also may be referred to as batteries throughout the detailed description) provide a way to add or remove one or more battery packs as needed, and multiple vehicles being serviced simultaneously (e.g., for charging or discharging) can reduce a number of charging stations needed (which can cut cost related to CAPEX and space).

For example, a charging station associated with the systems, methods, and apparatus described herein may beneficially supply charge to one or more vehicles using individual batteries within a plurality of stackable batteries or larger vehicles using multiple batteries from the stack for each of the larger vehicles. The charge may be distributed equally, or at different rates or by different amounts, among various vehicles by using the stackable batteries. Moreover, advantageously, individual batteries within the stack can charge different vehicles at once, or multiple batteries within the stack can charge a singular vehicle to speed up its charging process.

Figure 1:
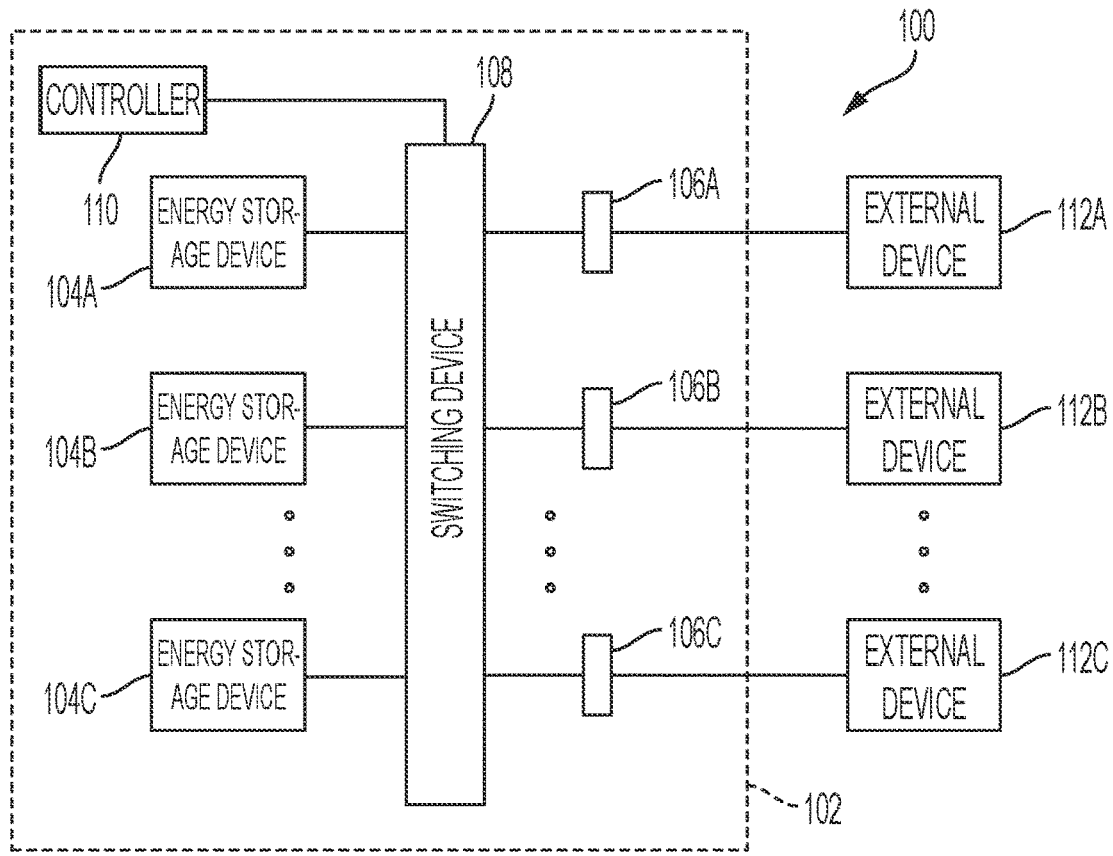
FIG. 1 is a block diagram of a system for managing storage or delivery of electrical energy according to an embodiment of the present invention.

Turning to FIG. 1, a system 100 for managing storage or delivery of electrical energy is disclosed. The system 100 includes a charging station 102, a plurality of stackable energy storage devices 104A-C, a plurality of connectors 106A-C, a switching device 108, a controller 110, and a plurality of external devices 112A-C.

As shown, the charging station 102 may include the plurality of stackable energy storage devices 104A-C, the plurality of connectors 106A-C, the switching device 108, and the controller 110. In some embodiments, the charging station 102 may be stationary and/or mobile. For example, the charging station 102 may be built to be stationary (i.e., fixed to a particular location). In some examples, the charging station 102 may be built to be mobile by, e.g., having a set of wheels or other means (not shown) for moving the charging station 102 as well as, e.g., a motor for propelling the charging station 102 to move from one location to another. Moreover, the charging station 102 may be a dual-mode (e.g., including a stationary mode and a mobile mode) apparatus and include a user interface (see, e.g., user interface 214 in FIG. 2) which may be utilized for setting the charging station 102 to be in a stationary mode or a mobile mode.

With reference to the plurality of stackable energy storage devices 104A-C, while only three (3) stackable energy storage devices (104A, 104B, and 104C) are shown, it would be apparent to one of ordinary skill in the art that the number of the stackable energy storage devices 104A-C may vary. The stackable energy storage devices 104A-C may be batteries of any type including for example a lithium-ion battery and contain individual battery units, each of which can be individually charged or discharged. Moreover, the stackable energy storage devices 104A-C may be grouped (logically or physically) into one or more groups of stackable energy storage devices 104A-C. In various embodiments, the stackable energy storage devices 104A-C may be connected in series, parallel, or a combination including both serial and parallel connections (e.g., in order to meet the voltage and/or capacity requirements of the external device(s)). In some embodiments, one or more of the stackable energy storage devices 104A-C may be connected via a single power circuit to the switching device 108. In some embodiments, each battery or battery unit of the stackable energy storage devices 104A-C may be connected to a single external device 112A, 112B, or 112C. In other embodiments, each group of the stackable energy storage devices 104A-C (each group including one or more of the stackable energy storage devices 104A-C, for example) may be connected to a single external device 112A, 112B, or 112C. In further embodiments, each battery or battery unit (or each group of the stackable energy storage devices 104A-C) may be connected to more than one of the external devices 112A-C.

The stackable energy storage devices 104A-C may be removable from the charging station 102 and may be housed in corresponding receptacles (not shown) within the charging station 102 to which the stackable energy storage devices 104A-C can be, e.g., clicked into (i.e., under tension). In some embodiments, the receptacles and/or the charging station 102 may include the necessary ports, wiring, and/or connections for enabling the connections between the stackable energy storage devices 104A-C and the external devices 112A-C, such that the stackable energy storage devices 104A-C and/or the receptacles may be easily removable from the charging station 102 without interrupting any functionality of the charging station 102 or any complicated disconnection and/or re-wiring of the remaining energy storage devices. Thus, the stackable energy storage devices 104A-C may be added to or removed from the charging station 102 as needed (e.g., additional stackable energy storage devices may be added to the charging station 102 to increase available capacity and/or power of the charging station 102).

Further, the removability of the stackable energy storage devices 104A-C allows one or more of the stackable energy storage devices 104A-C to be repurposed or refurbished as, e.g., a mobile range extender, a home back-up battery, or a mobile power station. For example, one or more of the stackable energy storage devices 104A-C removed from the charging station 102 may be used for various commercial or consumer related purposes including but not limited to, for example, for connecting (e.g., directly) to a DC-to-DC boost converter of an electric vehicle (e.g., supplying energy to a main battery of the vehicle while the vehicle is being driven). Moreover, in some embodiments, the stackable energy storage devices 104A-C may be ergonomically sized such that the stackable energy storage devices 104A-C may be easily removable and/or transportable, thus allowing the stackable energy storage devices 104A-C to be easily repurposed. In some embodiments, the stackable energy storage devices 104A-C removed from the charging station 102 may be stored in a front trunk ("trunk"), a truck bed or deck, a trailer, and/or the like of an electric vehicle to function as a range extender. The energy storage devices 104A-C (and the corresponding receptacle(s), as well as the corresponding connectors 106A-C in some examples) may be stackable within the electric vehicle when functioning as a range extender. In some embodiments, an integrated CPU (central processing unit) and/or a solar controller may be utilized, e.g., by the electric vehicle (or a power controller at, e.g., a home or business site incorporating the stackable energy storage devices 104A-C removed from the charging station 102) to enable, e.g., uninterruptible power supply (UPS) or transfer/switching among an electric grid line, solar or other renewable energy source, and/or the energy storage devices 104A-C, including a direct AC input/output connection to a home circuit breaker panel. Moreover, the stackable battery system described herein can allow for an integrated solar controller, allowing for direct DC solar panel, solar array, or turbine input. That is, the integrated CPU can allow for individual batteries to be reallocated, and the integrated solar controller can allow for direct solar panel renewable energy generator input (e.g., solar, fuel cell, turbine, etc.). The AC input/output can allow connection to the home for recharging the battery or supplying power back to the home, e.g., when the electric grid is down.

As shown in FIG. 1, the stackable energy storage devices 104A-C may be connected to the external devices 112A-C via the connectors 106A-C. The connectors 106A-C may be any type of connectors known in the art to provide a connection between the stackable energy storage devices 104A-C and the external devices 112A-C. The external devices 112A-C may be connected to the stackable energy storage devices 104A-C (e.g., for receiving electrical energy) via the connectors 106A-C and corresponding plugs of cables or wires extending from the external devices 112A-C plugged into the connectors 106A-C. Thus, more than one of the external devices 112A-C may be serviced by the charging station 102 simultaneously (for, e.g., receiving or providing electrical energy). Moreover, while not shown, the charging station 102 may include other types of device interfaces for input and/or output—such as for example AC (alternating current) outlets and USB (universal serial bus) outlets as well as DC (direct current) input (e.g., from a solar or fuel cell energy source), AC input, etc.

The switching device 108 may be configured to open and/or close one or more connections between the stackable energy storage devices 104A-C and the connectors 106A-C, thus enabling and/or disabling one or more connections between the stackable energy storage devices 104A-C and the external devices 112A-C. In some embodiments, the switching device 108 may include a plurality of switches (e.g., of any type known in the art; an example of the switching device 108 including a BMS (Battery Management System)) which may be controlled (individually and/or in group) to provide the connections between the stackable energy storage devices 104A-C and the connectors 106A-C (thus the external devices 112A-C).

The controller 110 may be connected or coupled to the switching device 108 to control the switching device 108 as described herein. Depending on needs of individual external devices 112A-C plugged in to the charging station 102 and connected to the stackable energy storage devices 104A-C, a single battery (e.g., the stackable energy storage device 104A) or more than one battery (e.g., any combination of the stackable energy storage devices 104A, 104B, and/or 104C) may be utilized to provide electrical energy to (i.e., charge) a battery of, e.g., an external device 112A. For example, if the connected external device such as a battery electric vehicle (BEV) (e.g., the external device 112A) requires an amount of energy larger than a threshold amount or a rate of charge (e.g., based on voltage and/or current) higher than a threshold rate, more than one of the stackable energy storage devices 104A-C may be used at once to charge an energy storage device (not shown) of the external device 112A (e.g., a semi-truck or the like).

Furthermore, for a higher load capacity than a threshold load capacity, more than one of the stackable energy storage devices 104A-C may be used at once to charge the external device 112A (or an energy storage device thereof). As discussed herein, such configurability allows for more efficient charging of the external devices 112A-C, and the charging station 102 may utilize reduced space due to the nature of the stacked energy storage devices and the capability of charging multiple devices at once.

Additionally, the controller 110 may control one or more components of the charging station 102 (e.g., the switching device 108) such that the stackable energy storage devices 104A-C may take charge from the external devices 112A-C. For example, if one or more of the external devices 112A-C have excess energy and a user wants to give back energy (e.g., of a user-configurable amount) to, e.g., an electric grid, the stackable energy storage devices 104A-C may receive charge from the external devices 112A-C, and the retrieved energy may be relayed to the electric grid. In some embodiments, the user may receive monetary compensation in exchange. As described herein, the reconfigurable stack of the stackable energy storage devices 104A-C may be used to accommodate a wide variety of charging needs by linking, combining, or separating power sources within the stack of the stackable energy storage devices 104A-C and/or among two or more of such battery stacks.

In some embodiments, the controller 110 may be included in the system 100 and include or couple to one or more processors. These one or more processors (i.e., the controller 110) may be implemented as a single processor or as multiple processors. For example, the controller 110 may be a microprocessor, a data processor, a microcontroller, or other controller, and may be electrically coupled to some or all of the other components within the charging station 102.

As discussed herein, the external devices 112A-C may each be any type of device including an energy storage device (e.g., a battery) which may receive or provide electrical energy from or to the stackable energy storage devices 104A-C (thus allowing bi-directional charging). In some embodiments, the external devices 112A-C may be battery electric vehicles.

Figure 2:
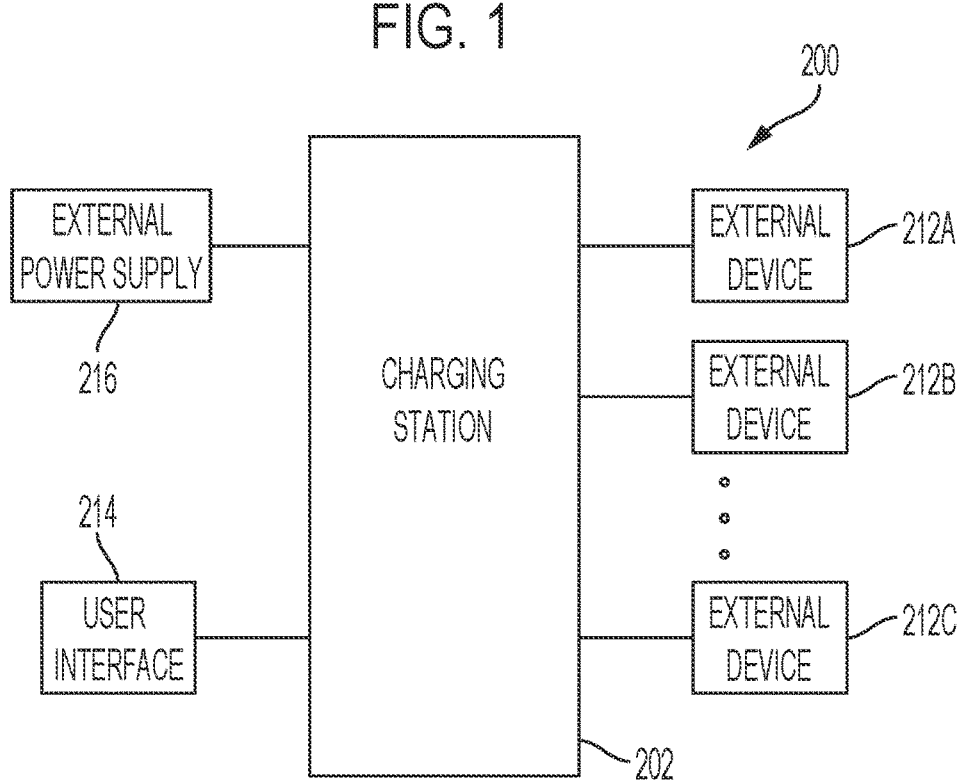
FIG. 2 is a block diagram of a system for managing storage or delivery of electrical energy according to an embodiment of the present invention.

FIG. 2 is a block diagram of a system 200 for managing storage or delivery of electrical energy. As shown, the system 200 includes a charging station 202, a plurality of external devices 212A-C, a user interface 214, and an external power supply 216.

The charging station 202 and the plurality of external devices 212A-C may be similar to, respectively, the charging station 102 and the plurality of external devices 112A-C (discussed herein with reference to FIG. 1) and include features and components described herein with reference to the charging station 102 and the plurality of external devices 112A-C shown in FIG. 1.

The user interface 214 may include an input and/or an output device (not shown). In some embodiments, the input device may include one or more input devices such as a button, a keyboard, a mouse, a touchscreen, a microphone, or the like. The input device may receive input from a user of an external device 212A, 212B, or 212C (e.g., a driver or a passenger of a battery electric vehicle including a battery to be charged or to discharge energy). The input device may receive, for example, information corresponding to a request for charging an energy storage device such as a battery of an external device 212A, 212B, or 212C. The request may include information such as a rate of charge/discharge (e.g., related to how fast to charge or discharge from the battery of the external device 212A, 212B, or 212C) and/or an amount of charge/discharge (e.g., 10%, 20%, 30%, 40%, 50%, 60%, 70%, 80%, 90%, 100%, etc. of the energy storage capacity) for the energy storage device of the external device 212A, 212B, or 212C. Further, the request may include information related to a monetary amount (corresponding to a predetermined rate or amount of charge) a user would like to spend for the charging/discharging services and/or an amount of time available or to be requested for the services. In some embodiments, if no such request is made, the services may include, e.g., charging or discharging from the energy storage device of the external device 212A, 212B, or 212C a default amount of energy at a default rate (e.g., charge to 100% of capacity at a predetermined default rate or speed). Moreover, the request may include information related to purchasing or renting one or more batteries (e.g., the stackable energy storage devices 104A-C of the charging station 102) from the charging station 202, which may be utilized for various purposes such as, e.g., extending a driving range of a vehicle, emergency roadside assistance, emergency back-up power, power supply to an off-grid load, etc. as described herein. Further, the request may also include information related to returning one or more batteries to be put back into the charging station 202. Additionally, the input device may accept various monetary payment methods as known in the art to receive payment for, e.g., charging a battery at a rate or by an amount higher than a threshold rate or a threshold amount or purchasing or renting a battery pack.

In some embodiments, an option to select the rate or amount of charge/discharge or purchase, rent, or return an energy storage device may be limited based on a minimum or maximum number (e.g., one or ten) of energy storage devices available in the charging station 202. When only the minimum number of energy storage device is available within the charging station 202, the input device may not provide or may disable or block the option to select the rate or amount of charge/discharge or purchase or rent the energy storage device until more than the minimum number of energy storage device becomes available. Moreover, when the maximum number of energy storage device is present in the charging station 202, the input device may not provide or may disable or block the option to return any energy storage device.

The output device of the user interface 214 may include any output device such as a speaker, a display, a touchscreen, or the like. The output device may output data to a user. For example, the output device may output information corresponding to a menu for selecting the rate or amount of charge/discharge or purchasing, renting, or returning an energy storage device discussed herein with reference to the input device of the user interface 214. In some embodiments, the output device may provide information related to an amount of compensation corresponding to an amount of energy discharged from the external devices 212A-C into the one or more stackable batteries included in the charging station 202. Further, the output device may include a dispenser for dispensing money corresponding to the amount of compensation.

In some embodiments, the user interface 214 may be a user interface device attached to or integrated with the charging station 202. In some embodiments, the user interface 214 may be a user interface available on a remote device such as, e.g., a smartphone, a tablet, or the like and/or as a part of an infotainment system of a vehicle which may be connected to the charging station 202 via wire or wirelessly. For example, the charging station 202 may further include a transceiver (not shown) which may be utilized to establish a wireless connection between the charging station 202 and the remote device including the user interface 214. The wireless connection may be provided by any type of wireless connection known in the art such as for example Bluetooth®. Moreover, if the user interface 214 has a higher level of compatibility (e.g., due to the user interface 214 being on an infotainment system of a vehicle of a particular maker while the charging station 202 is also manufactured or designed by the same particular maker), there may be more information (e.g., related to state-of-charge (SOC), etc.) which can be made readily available and communicated (e.g., automatically detected upon the vehicle being connected to the charging station 202)— e.g., without human intervention. In some embodiments, Internet of Things (IoT) connections known in the art may be utilized for such information to be exchanged between the charging station 202 and the vehicle.

The external power supply 216 may be a source of additional energy which can be utilized to charge one or more energy storage devices within the charging station 202 (e.g., the stackable energy storage devices 104A-C of the charging station 102) when the one or more batteries are not in use. In some embodiments, the external power supply 216 may include an electrical power supply connected to an electric outlet or a renewable energy source (e.g., a solar panel, a windmill, a wind turbine, etc.). A controller (e.g., the controller 110 of the charging station 102) of the charging station 202 may determine when the one or more batteries are not in use and configure one or more switches (e.g., as included in the switching device 108 of the charging station 102) of the charging station 202 which may be disposed between the external power supply 216 and the one or more batteries (e.g., the stackable energy storage devices 104A-C) such that the external power supply 216 charges the one or more batteries that are not in use. In some embodiments, the external power supply 216 may charge the one or more batteries that are not in use while the system 200 is simultaneously discharging energy to one or more external devices 212A-C.

Figure 3:
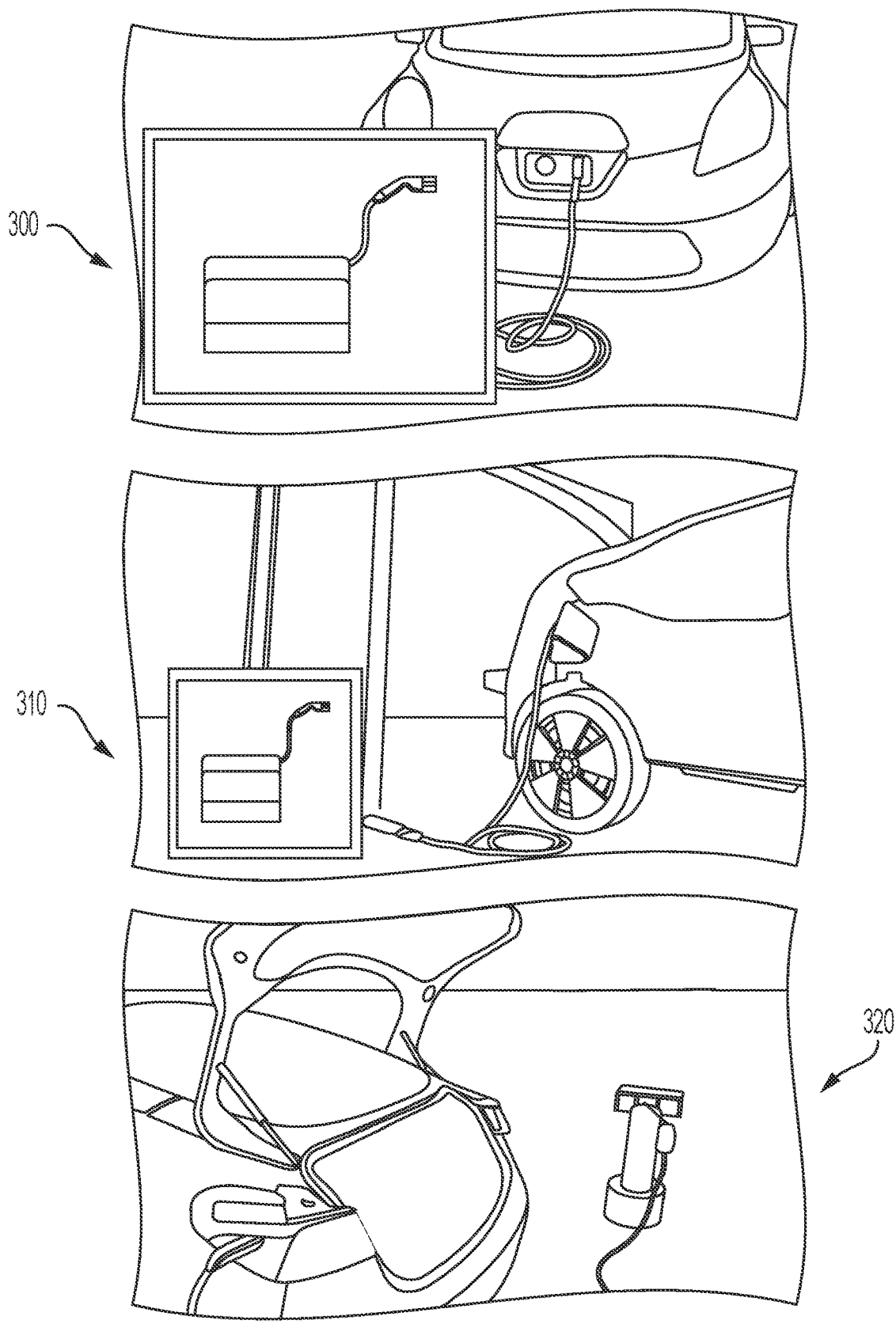
FIG. 3 is an illustration of example modular or stackable energy storage device systems each having a system for managing storage or delivery of electrical energy according to an embodiment of the present invention.

FIG. 3 is an illustration of example charging stations 300, 310, and 320 each having a system (e.g., system 100 or system 200) for managing storage or delivery of electrical energy.

The example charging station 300 is a mobile energy charger for, e.g., a vehicle (e.g., a battery electrical vehicle). As shown, the example charging station 300 may include a plurality of stackable energy storage devices (e.g., similar to the stackable energy storage devices 104A-C discussed herein with reference to FIG. 1) which may be utilized to charge, e.g., the electric vehicle(s) as described herein with reference to FIG. 2.

The example charging station 310 provides an emergency back-up power for a home or a business. As shown, the example charging station 310 may include a plurality of stackable energy storage devices (e.g., similar to the stackable energy storage devices 104A-C discussed herein with reference to FIG. 1) which may be utilized to provide the emergency back-up power for any device including, e.g., an electric vehicle at a home or business site. Moreover, the example charging station 310 may include an additional energy power supply (e.g., the external power supply 216 described herein with reference to FIG. 2) which may provide, e.g., a solar, wind, or other energy (e.g., renewable energy) which can be stored in the plurality of stackable energy storage devices of the example charging station 310.

The example charging station 320 may provide power to an off-grid load (e.g., an electronic device, an appliance, an electric vehicle), which may be disposed, e.g., within the electric vehicle, a portable power station, or the like.

While not shown, additional examples of charging stations having a system (e.g., system 100 or system 200) for managing storage or delivery of electrical energy may include a charging station for musical instruments, a construction site, lawn care, motorcycle, ATVs (All-Terrain Vehicles), boats, tailgating, outdoor recreational lighting, stationary systems (for security, surveillance, monitoring, emergency services, remote cabin, or the like), etc.

Figure 4A:
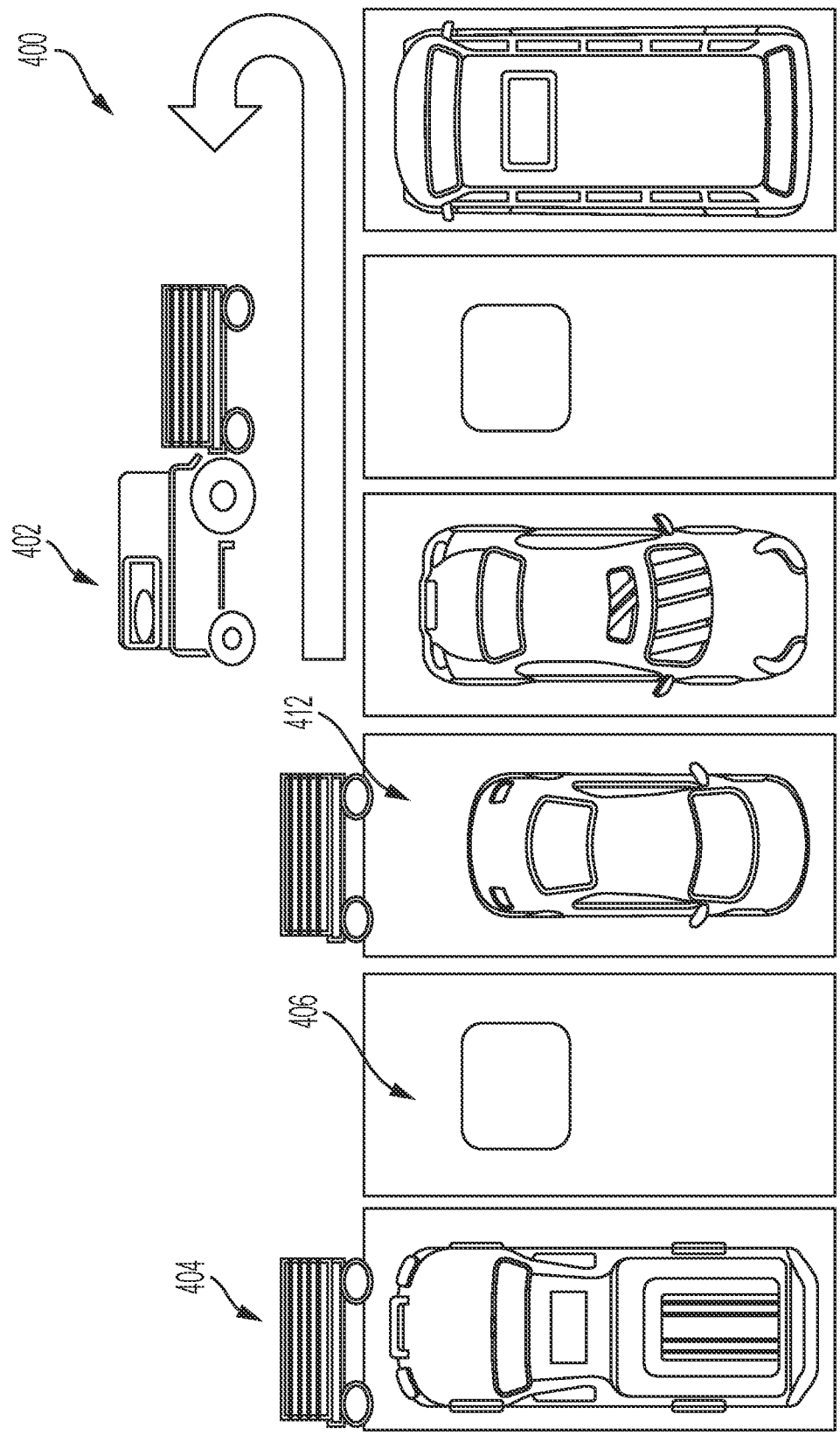
FIGS. 4A and 4B are illustrations of additional example modular or stackable energy storage device systems each having a system for managing storage or delivery of electrical energy according to an embodiment of the present invention.
Figure 4B:
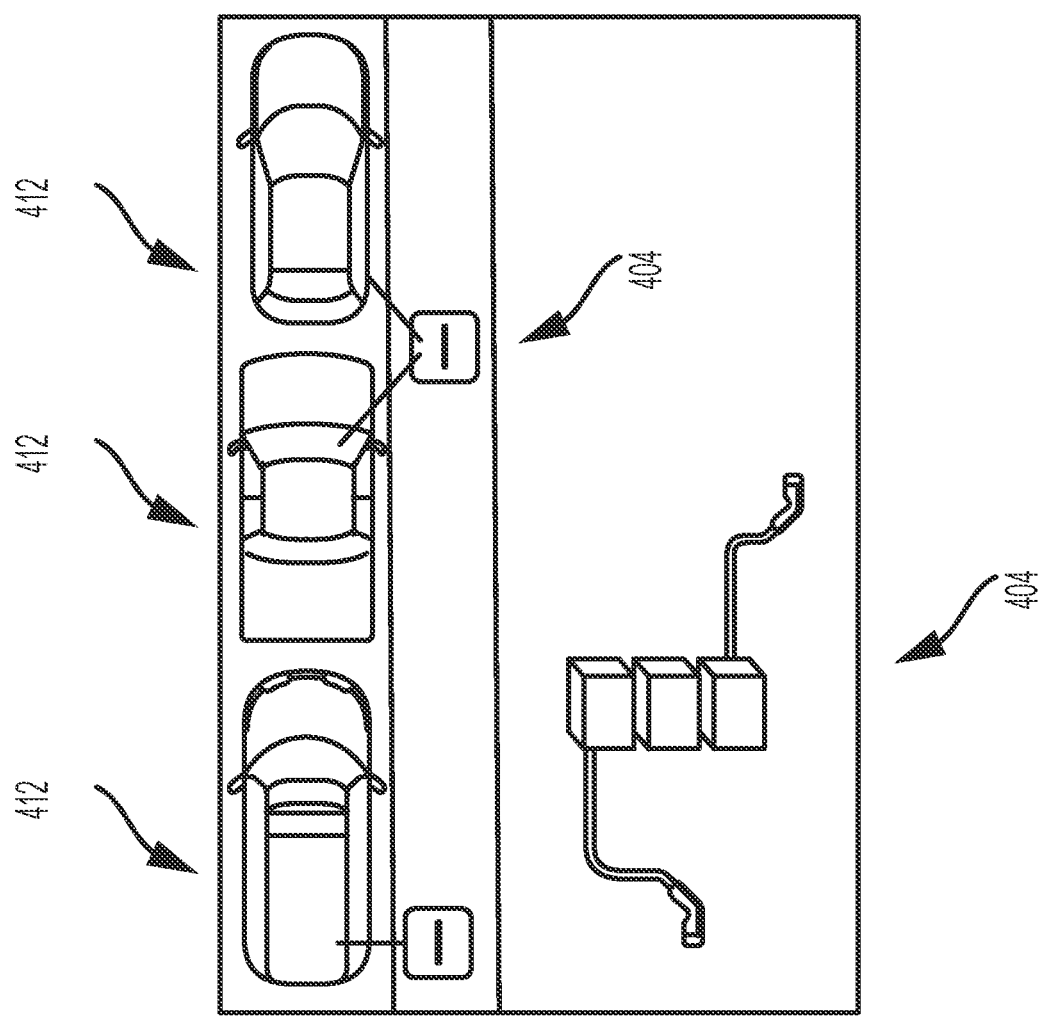

FIGS. 4A and 4B are illustrations of additional example charging stations each having a system 400 for managing storage or delivery of electrical energy. For example, as shown in FIG. 4A, a charging station (or the system 400) may include a mobile apparatus 402 (e.g., a vehicle or a robot), one or more sets of stackable energy storage devices 404, and one or more connection devices 406. The mobile apparatus 402 may be manually or autonomously propelled to move from one location to another throughout an area (e.g., a parking lot) to provide a charging station service (e.g., that of charging station 102, charging station 202, or the like, as described herein) to various devices 412 (e.g., electric vehicles) throughout the area without a need to install more than a minimum number of charging stations (e.g., one), saving space in the area (i.e., by not having as many stationary charging stations). For example, the mobile apparatus 402 may retrieve one or more sets of the stackable energy storage devices 404 from a designated area (loaded manually or automatically by, e.g., a human or a machine) and provide the charging station service.

A plurality of stackable energy storage devices 404, which may be housed in a receptacle (e.g., with a set of wheels, as shown in FIG. 4A) may provide energy receiving, storing, and/or providing services described in more detail with reference to FIGS. 1 and 2. In some embodiments, the plurality of stackable energy storage devices 404 may be moved from one location to another by the mobile apparatus 402. In each location (e.g., with an available connecting device 406), the plurality of stackable energy storage devices 404 may connect to the connecting device 406 by any means as would be known by one of ordinary skill in the art (e.g., through an underground or above-ground wiring between a plug above ground to be connected to the receptacle and the connecting device 406).

In some embodiments, the connecting device 406 may be a wireless charging pad. For example, a wireless charging technology known by one of ordinary skill in the art (e.g., inductive charging) may be utilized to provide energy to or receive energy from the device 412. In this example, a customer (e.g., in a vehicle such as the device 412) may not need to touch any part of the system 400; rather, the customer may make a request to charge or discharge energy from an energy storage device of the vehicle from a mobile phone application, a vehicle infotainment system, or the like. For example, a server (not shown) may receive a request from the mobile phone application or the infotainment system for an energy service, and the server may communicate with the mobile apparatus 402 and deploy the mobile apparatus 402 to deliver a plurality of energy storage devices 404 to a location with a connecting device 406 near which the customer's vehicle may be located. The plurality of energy storage devices 404 may then connect to the connecting device 406 to provide the energy service to the device 412.

The mobile phone application or the infotainment system may provide status update(s) regarding the energy service. In some examples, the energy service may include a collection or purchase of unused energy from the device 412, so that the unused energy may be transferred back to an electric grid.

In some embodiments, the connecting device 406 may not be on the ground—it may be an upright apparatus (not shown) with a port for making a wired connection with the device 412 to provide the energy services described herein. In some embodiments, the connecting device 406 may also include a communications device to enable gathering of SOC information related to the device 412 which may be utilized by the system 400 to determine how much, if any, energy is required to charge the device 412. In some examples, the server may determine how much energy is required to fully charge the device 412. Moreover, the SOC information may be utilized by the system 400 to determine whether each of the devices 412 (e.g., vehicles) need to be charged (including, e.g., by how much and at which rate, etc. based on the capabilities of the vehicles.

Turning now to FIG. 4B, in some embodiments, the energy storage devices 404 may be connected directly to the devices 412 (i.e., without a connecting device 406). Each connection may be made with, e.g., a cable, and the energy storage devices 404 may be enclosed in a housing or a receptacle (not shown) which may include the required connection ports to enable the connection between the energy storage devices 404 and the devices 412. As shown, in some embodiments, one stack of a plurality of energy storage devices 404 may be utilized to provide the energy charging or discharging services described herein to multiple vehicles simultaneously. In some embodiments, the system 404 may provide the energy charging or discharging services described herein at a place (e.g., a narrow parking lot, a street parking area, or the like) where only narrow spaces (i.e., which may be too narrow or small for a conventional charging station to be installed) are available for a charging station.

Figure 5:
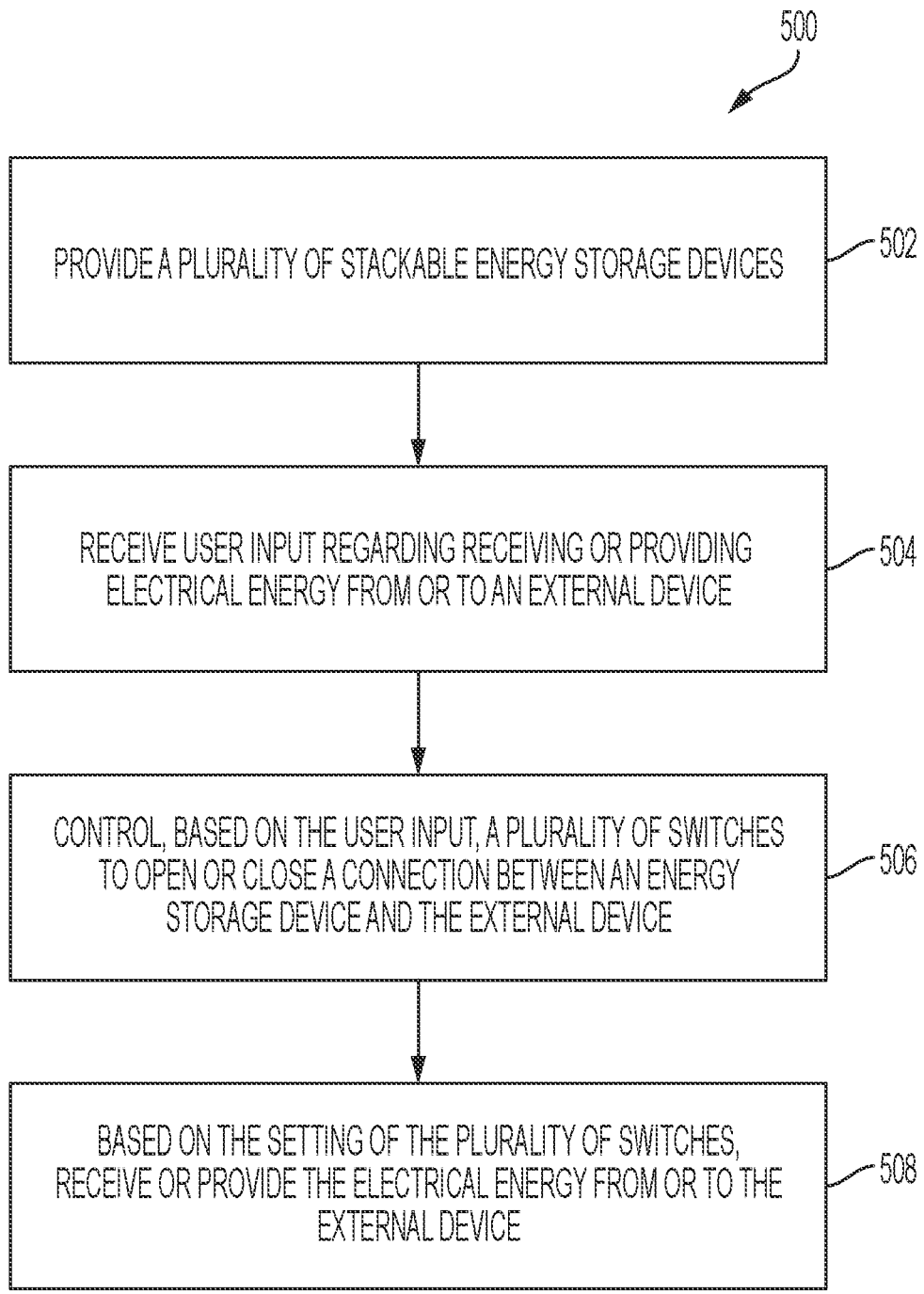
FIG. 5 is a flowchart illustrating a method for managing storage or delivery of electrical energy according to an embodiment of the present invention.

FIG. 5 is a flowchart illustrating a method 500 for managing storage or delivery of electrical energy, which may be performed by a system or an apparatus for managing storage or delivery of electrical energy (see, e.g., system 100 and system 200). The method 500 may include providing a plurality of stackable energy storage devices (step 502). In some embodiments, the plurality of stackable energy storage devices (e.g., the stackable energy storage devices 413A-C) may be configured to at least one of: receive electrical energy from at least one external device, or provide the electrical energy to the at least one external device.

In step 504, the method 500 may include receiving, via a user interface (e.g., user interface 214), user input regarding receiving the electrical energy from the at least one external device (e.g., the external devices 112A-C, the external devices 212A-C, or the like) or providing the electrical energy to the at least one external device.

In step 506, the method 500 may include controlling, via a controller and based on the user input, a plurality of switches disposed between the plurality of stackable energy storage devices and one or more connectors to open or close a connection between an energy storage device of the plurality of stackable energy storage devices and an external device of the at least one external device.

In some embodiments, the controlling may be performed such that the electrical energy is received from or provided to the external device based on the connection being closed, and the electrical energy is not received from or provided to the external device based on the connection being open.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for managing storage or delivery of electrical energy, the system comprising:
a plurality of stackable energy storage devices configured to:
receive the electrical energy from at least one vehicle, and
provide the electrical energy to the at least one vehicle;
one or more connectors each configured to:
connect to a vehicle of the at least one vehicle, and
enable a connection between an energy storage device of the plurality of stackable energy storage devices and the vehicle;
a plurality of switches disposed between the plurality of stackable energy storage devices and the one or more connectors and each configured to open or close the connection between the energy storage device and the vehicle; and
a controller coupled to the plurality of switches and configured to:
control at least one switch of the plurality of switches to open or close the connection between the energy storage device and the vehicle such that:
the electrical energy is received from or provided to the vehicle when the connection is closed, and
the electrical energy is not received from or provided to the vehicle when the connection is open.

2. The system of claim 1, wherein:
the controller is further configured to control one or more switches of the plurality of switches such that the electrical energy is received from or provided to two or more vehicles of the at least one vehicle.

3. The system of claim 2, wherein:
the controller is further configured to control the one or more switches of the plurality of switches such that the electrical energy is received from or provided to the two or more vehicles of the at least one vehicle simultaneously.

4. The system of claim 1, wherein:
the controller is further configured to control one or more switches of the plurality of switches such that:
a first energy storage device of the plurality of stackable energy storage devices provides a first electrical energy to a first vehicle of the at least one vehicle, and
a second energy storage device of the plurality of stackable energy storage devices receives a second electrical energy from a second vehicle of the at least one vehicle.

5. The system of claim 4, wherein:
the controller is further configured to control the one or more switches of the plurality of switches such that the first energy storage device provides the first electrical energy to the first vehicle and the second energy storage device receives the second electrical energy from the second vehicle simultaneously.

6. The system of claim 1, wherein the at least one vehicle includes an electric vehicle including a battery.

7. The system of claim 1, further comprising a plurality of receptacles each removably disposed within an apparatus including the system, the each receptacle being detachable from one another of the plurality of receptacles and configured to house at least one of the plurality of stackable energy storage devices.

8. The system of claim 1, further comprising a user interface configured to receive user input selecting whether the vehicle will receive the electrical energy or provide the electrical energy, and
wherein the controller is further configured to control the plurality of switches based on the user input.

9. The system of claim 8, wherein the user interface is further configured to provide output related to an amount of monetary compensation corresponding to the electrical energy received from the vehicle.

10. The system of claim 8, wherein the user interface is further configured to provide compensation corresponding to the electrical energy received from the vehicle.

11. A charging station for managing storage or delivery of electrical energy, the charging station comprising:
a plurality of stackable energy storage devices configured to:
receive the electrical energy from at least one vehicle, and
provide the electrical energy to the at least one vehicle;
one or more connectors each configured to:
connect to a vehicle of the at least one vehicle, and
enable a connection between an energy storage device of the plurality of stackable energy storage devices and the vehicle;
a plurality of switches disposed between the plurality of stackable energy storage devices and the one or more connectors and each configured to open or close the connection between the energy storage device and the vehicle; and
a controller coupled to the plurality of switches and configured to:
control at least one switch of the plurality of switches to open or close the connection between the energy storage device and the vehicle such that:
the electrical energy is received from or provided to the vehicle when the connection is closed, and
the electrical energy is not received from or provided to the vehicle when the connection is open.

12. The charging station of claim 11, wherein the charging station is mobile.

13. The charging station of claim 11, wherein the charging station is stationary.

14. The charging station of claim 11, further comprising a user interface; configured to receive user input selecting whether the vehicle will receive the electrical energy or provide the electrical energy, and
wherein the controller is further configured to control the plurality of switches based on the user input.

15. The charging station of claim 14, wherein the user interface is further configured to at least one of:
provide output related to an amount of monetary compensation corresponding to the electrical energy received from the vehicle, or
dispense money corresponding to the electrical energy received from the vehicle.

16. A method of managing storage or delivery of electrical energy, the method comprising:
providing a plurality of stackable energy storage devices configured to:
receive the electrical energy from at least one vehicle, and
provide the electrical energy to the at least one vehicle;
receiving, via a user interface, user input selecting between receiving the electrical energy from the at least one vehicle or providing the electrical energy to the at least one vehicle; and
controlling, via a controller and based on the user input, a plurality of switches disposed between the plurality of stackable energy storage devices and one or more connectors to open or close a connection between an energy storage device of the plurality of stackable energy storage devices and a vehicle of the at least one vehicle, such that:
the electrical energy is received from or provided to the vehicle based on the connection being closed, or
the electrical energy is not received from or provided to the vehicle based on the connection being open.

17. The method of claim 16, further comprising:
controlling the plurality of switches such that the electrical energy is received from or provided to two or more vehicles simultaneously.

18. The method of claim 16, further comprising:
controlling the plurality of switches such that a first energy storage device provides a first electrical energy to a first vehicle and a second energy storage device receives a second electrical energy from a second vehicle simultaneously.

19. The method of claim 16, further comprising providing compensation corresponding to the electrical energy received from the vehicle.

20. The method of claim 19, further comprising displaying information related to the compensation corresponding to the electrical energy received from the vehicle.

* * * * *